US012681874B2

(12) United States Patent
Govindarajan et al.

(10) Patent No.: US 12,681,874 B2
(45) Date of Patent: *Jul. 14, 2026

(54) PCIe PERIPHERAL SHARING

(71) Applicant: TEXAS INSTRUMENTS INCORPORATED, Dallas, TX (US)

(72) Inventors: Sriramakrishnan Govindarajan, Bengaluru (IN); Kishon Vijay Abraham Israel Vijayponraj, Bengaluru (IN); Mihir Narendra Mody, Bengaluru (IN); Jason A. T. Jones, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,055

(22) Filed: Jun. 27, 2024

(65) Prior Publication Data

US 2024/0345970 A1     Oct. 17, 2024

Related U.S. Application Data

(63) Continuation of application No. 18/186,524, filed on Mar. 20, 2023, now Pat. No. 12,050,541, which is a
(Continued)

(51) Int. Cl.
G06F 13/16        (2006.01)
G06F 12/10        (2016.01)
(Continued)

(52) U.S. Cl.
CPC .......... G06F 13/1668 (2013.01); G06F 12/10 (2013.01); G06F 13/4022 (2013.01);
(Continued)

(58) Field of Classification Search
CPC .. G06F 13/1668; G06F 12/10; G06F 13/4022; G06F 13/4221; G06F 13/4282; G06F 2213/0026
See application file for complete search history.

(56) References Cited

U.S. PATENT DOCUMENTS 7,979,592 B1     7/2011  Pettey
2008/0147898 A1  6/2008  Freimuth
(Continued)

FOREIGN PATENT DOCUMENTS

JP     2008152786 A     7/2008
JP     2019145153 A     8/2019

OTHER PUBLICATIONS

Extended European Search report for issued on May 15, 2023 by the EPO (12 pages).
(Continued)

*Primary Examiner* — Henry Tsai
*Assistant Examiner* — Harry Z Wang
(74) *Attorney, Agent, or Firm* — Michael T. Gabrik; Frank D. Cimino

(57)        ABSTRACT

A peripheral proxy subsystem provides routing mechanisms to allow multiple hosts to communicate with multiple functions, physical and virtual, of a single root I/O virtualization (SR-IOV) peripheral, which may include a physical function and a plurality of virtual functions associated with the physical function. The peripheral proxy subsystem, which may be embodied as a controller, includes a first endpoint interface; a second endpoint interface; and a single root controller interface configured to couple to the SR-IOV peripheral. The controller is configured to be able to present through the single root controller interface: a first subset of the plurality of virtual functions through a first cloned instance of the physical function at the first endpoint interface; and a second subset of the plurality of virtual functions
(Continued)

100

102 — HOST 1    HOST 2 — 104
        PCIe       PCIe

106

PCIe SWITCH

PCIe       PCIe
108 —  PCIe NVME   PCIe 25G   — 110
                   ETHERNET through a second cloned instance of the physical function at the second endpoint interface.

15 Claims, 13 Drawing Sheets

Related U.S. Application Data continuation of application No. 17/073,925, filed on Oct. 19, 2020, now Pat. No. 11,609,866.

(60) Provisional application No. 62/956,374, filed on Jan. 2, 2020.

(51) Int. Cl.
_G06F 13/40_ (2006.01)
_G06F 13/42_ (2006.01)

(52) U.S. Cl.
CPC ...... _G06F 13/4221_ (2013.01); _G06F 13/4282_ (2013.01); _G06F 2213/0026_ (2013.01)

(56) References Cited

U.S. PATENT DOCUMENTS

| | | | | |
|---|---|---|---|---|
| 2008/0147937 | A1* | 6/2008 | Freimuth | ............ G06F 13/4022 |
| | | | | 710/104 |
| 2008/0147943 | A1 | 6/2008 | Freimuth | |
| 2011/0179214 | A1 | 7/2011 | Goggin | |
| 2012/0054396 | A1 | 3/2012 | Bhattacharya | |
| 2012/0096192 | A1 | 4/2012 | Tanaka | |
| 2012/0284437 | A1 | 11/2012 | Ayzenfeld | |
| 2013/0173837 | A1 | 7/2013 | Glaser | |
| 2013/0283264 | A1* | 10/2013 | Bhattacharya | ...... G06F 9/45558 |
| | | | | 718/1 |
| 2014/0075006 | A1 | 3/2014 | Cherian | |
| 2014/0331223 | A1 | 11/2014 | Lee | |
| 2015/0149661 | A1* | 5/2015 | Kanigicherla | .......... G06F 13/10 |
| | | | | 710/62 |
| 2016/0019079 | A1 | 1/2016 | Chawla | |
| 2016/0098365 | A1* | 4/2016 | Bshara | ................ G06F 13/4282 |
| | | | | 710/313 |
| 2016/0098372 | A1 | 4/2016 | Boyle | |
| 2016/0188513 | A1* | 6/2016 | Nair | ...................... G06F 13/366 |
| | | | | 710/113 |
| 2016/0328344 | A1 | 11/2016 | Jose | |
| 2017/0177528 | A1 | 6/2017 | Harriman | |
| 2018/0052793 | A1 | 2/2018 | Fang | |
| 2019/0146895 | A1* | 5/2019 | Zhang | ................ G06F 13/4022 |
| | | | | 710/34 |
| 2020/0278935 | A1 | 9/2020 | Borikar | |

OTHER PUBLICATIONS

International Search Report for PCT/US2020/067114, mailed Apr. 8, 2021.

Office Action and Search Report in corresponding China Application No. 202080094552.7, issued Dec. 9, 2025, 17 pgs.

* cited by examiner

SYSTEM INITIALIZATION SEQUENCE

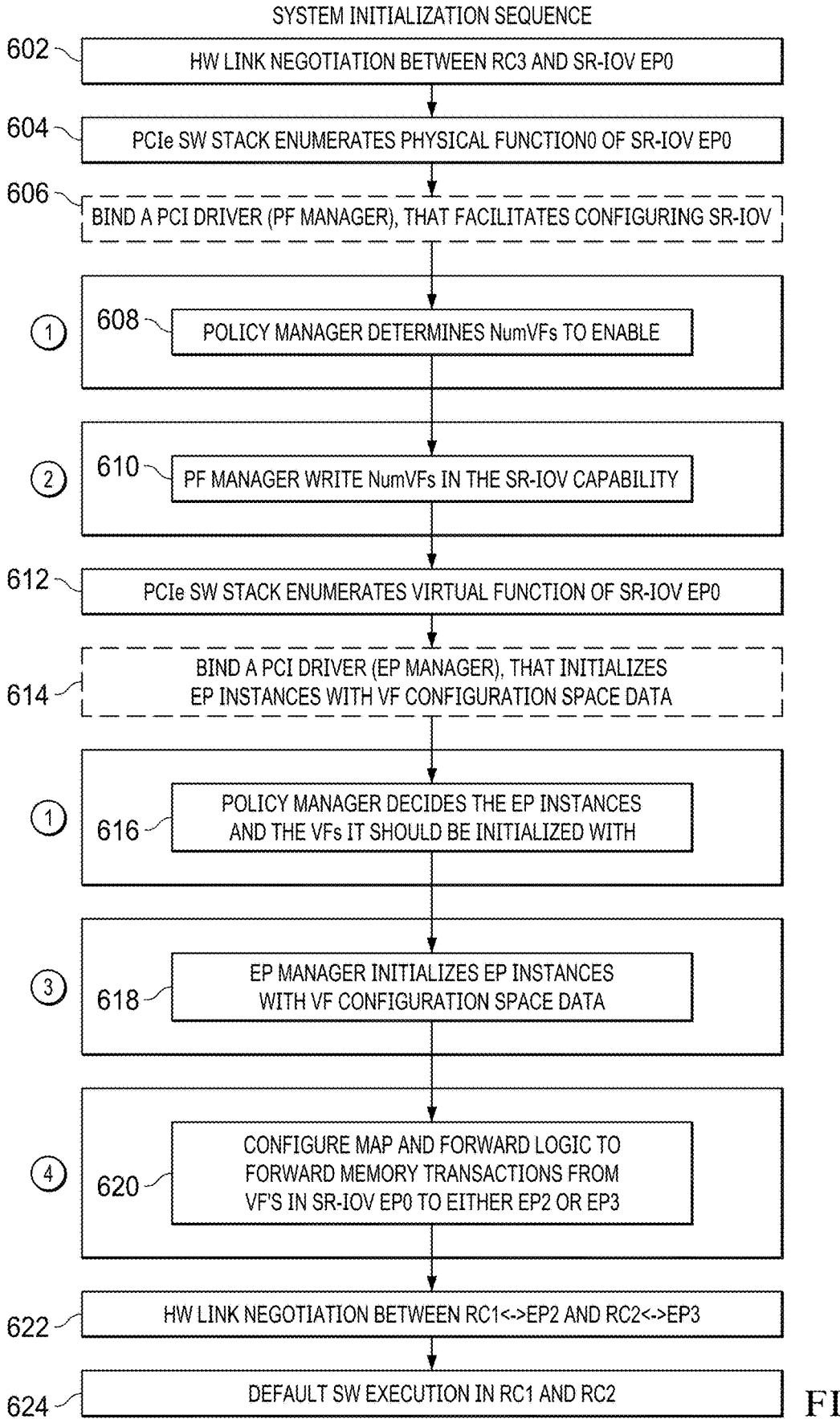

602   HW LINK NEGOTIATION BETWEEN RC3 AND SR-IOV EP0

604   PCIe SW STACK ENUMERATES PHYSICAL FUNCTION0 OF SR-IOV EP0

606   BIND A PCI DRIVER (PF MANAGER), THAT FACILITATES CONFIGURING SR-IOV

①   608   POLICY MANAGER DETERMINES NumVFs TO ENABLE

②   610   PF MANAGER WRITE NumVFs IN THE SR-IOV CAPABILITY

612   PCIe SW STACK ENUMERATES VIRTUAL FUNCTION OF SR-IOV EP0

614   BIND A PCI DRIVER (EP MANAGER), THAT INITIALIZES EP INSTANCES WITH VF CONFIGURATION SPACE DATA

①   616   POLICY MANAGER DECIDES THE EP INSTANCES AND THE VFs IT SHOULD BE INITIALIZED WITH

③   618   EP MANAGER INITIALIZES EP INSTANCES WITH VF CONFIGURATION SPACE DATA

④   620   CONFIGURE MAP AND FORWARD LOGIC TO FORWARD MEMORY TRANSACTIONS FROM VF'S IN SR-IOV EP0 TO EITHER EP2 OR EP3

622   HW LINK NEGOTIATION BETWEEN RC1<->EP2 AND RC2<->EP3

624   DEFAULT SW EXECUTION IN RC1 AND RC2

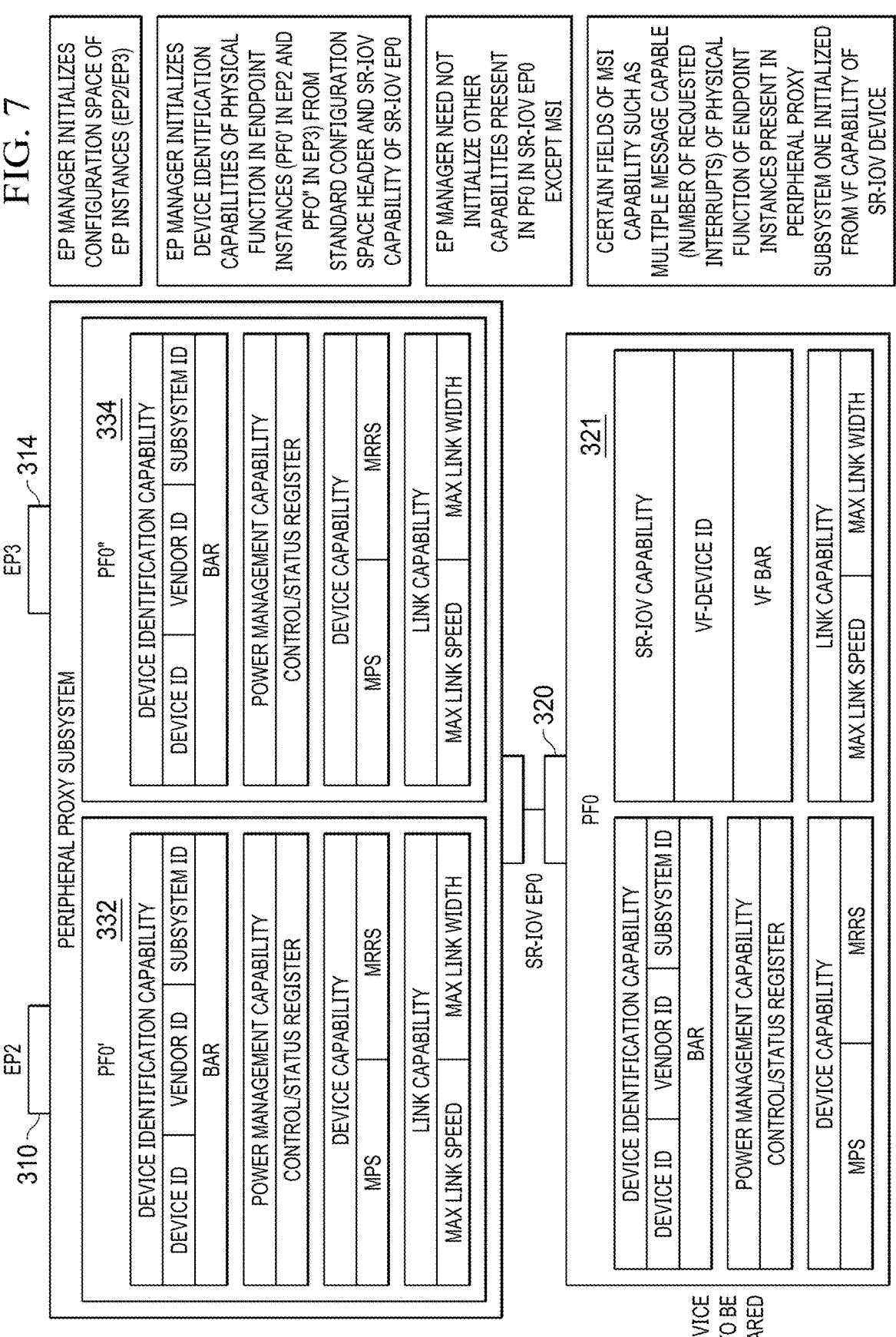

EP MANAGER INITIALIZES CONFIGURATION SPACE OF EP INSTANCES (EP2/EP3)

EP MANAGER INITIALIZES DEVICE IDENTIFICATION CAPABILITIES OF PHYSICAL FUNCTION IN ENDPOINT INSTANCES (PF0' IN EP2 AND PF0" IN EP3) FROM STANDARD CONFIGURATION SPACE HEADER AND SR-IOV CAPABILITY OF SR-IOV EP0

EP MANAGER NEED NOT INITIALIZE OTHER CAPABILITIES PRESENT IN PF0 IN SR-IOV EP0 EXCEPT MSI

CERTAIN FIELDS OF MSI CAPABILITY SUCH AS MULTIPLE MESSAGE CAPABLE (NUMBER OF REQUESTED INTERRUPTS) OF PHYSICAL FUNCTION OF ENDPOINT INSTANCES PRESENT IN PERIPHERAL PROXY SUBSYSTEM ONE INITIALIZED FROM VF CAPABILITY OF SR-IOV DEVICE

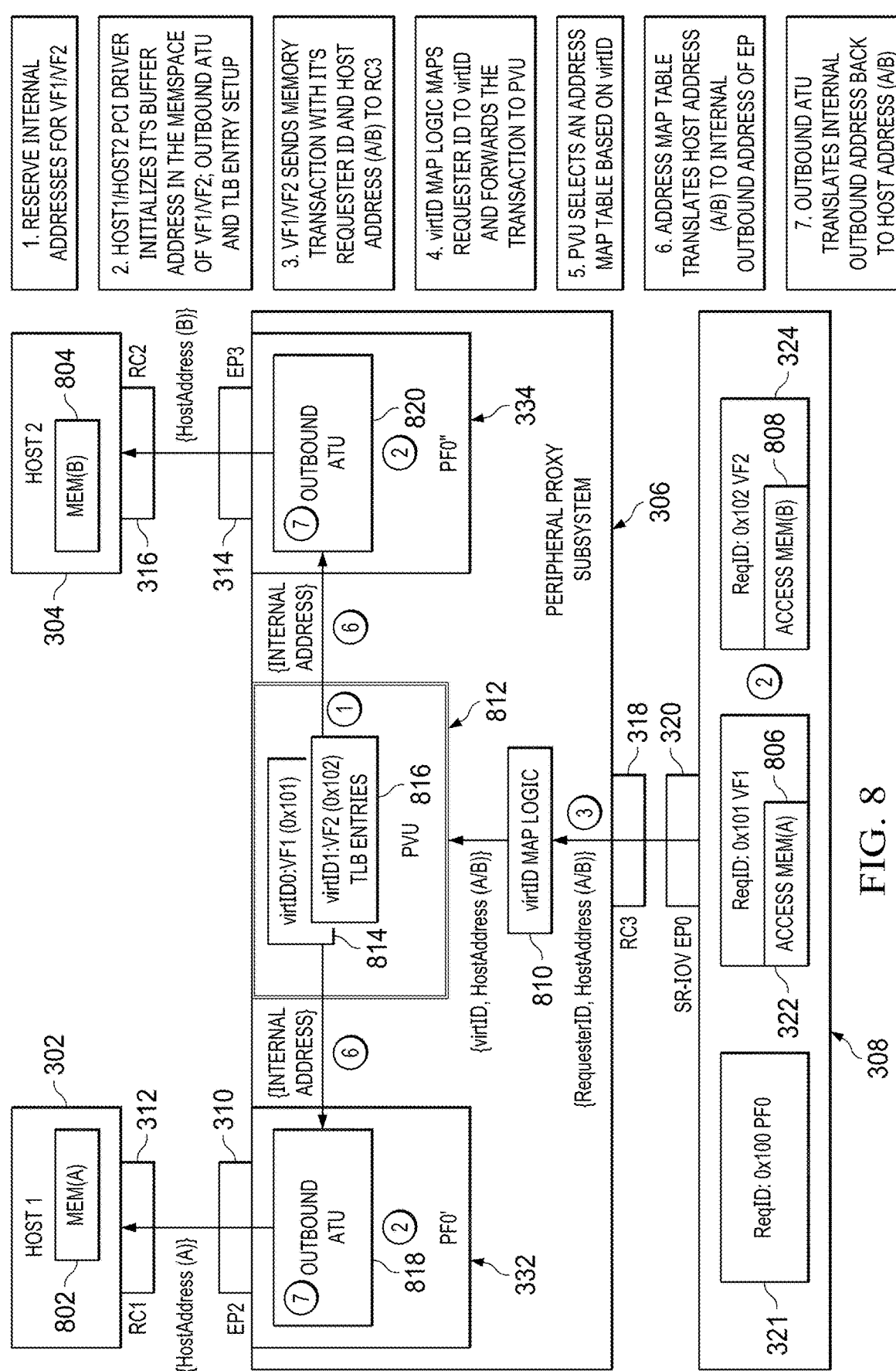

1. RESERVE INTERNAL ADDRESSES FOR VF1/VF2

2. HOST1/HOST2 PCI DRIVER INITIALIZES IT'S BUFFER ADDRESS IN THE MEMSPACE OF VF1/VF2; OUTBOUND ATU AND TLB ENTRY SETUP

3. VF1/VF2 SENDS MEMORY TRANSACTION WITH IT'S REQUESTER ID AND HOST ADDRESS (A/B) TO RC3

4. virtID MAP LOGIC MAPS REQUESTER ID TO virtID AND FORWARDS THE TRANSACTION TO PVU 5. PVU SELECTS AN ADDRESS MAP TABLE BASED ON virtID 6. ADDRESS MAP TABLE TRANSLATES HOST ADDRESS (A/B) TO INTERNAL OUTBOUND ADDRESS OF EP

7. OUTBOUND ATU TRANSLATES INTERNAL OUTBOUND ADDRESS BACK TO HOST ADDRESS (A/B)

FIG. 8

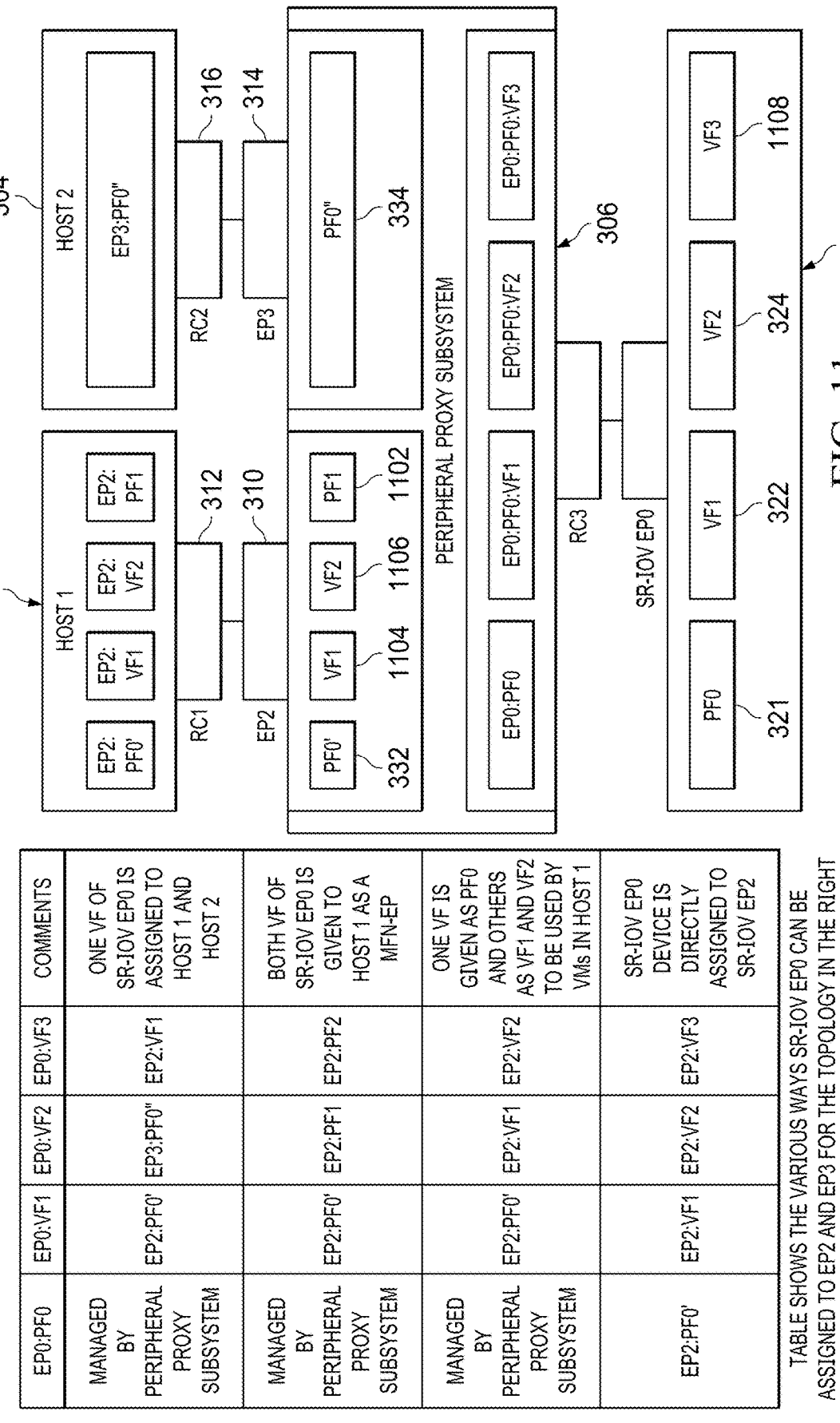

FIG. 11

| EP0:PF0 | EP0:VF1 | EP0:VF1 | EP0:VF2 | EP0:VF3 | COMMENTS |
|---------|---------|---------|---------|---------|----------|
| MANAGED BY PERIPHERAL PROXY SUBSYSTEM | EP2:PF0' | EP3:PF0" | | EP2:VF1 | ONE VF OF SR-IOV EP0 IS ASSIGNED TO HOST 1 AND HOST 2 |
| MANAGED BY PERIPHERAL PROXY SUBSYSTEM | EP2:PF0' | | EP2:PF2 | EP2:PF1 | BOTH VF OF SR-IOV EP0 IS GIVEN TO HOST 1 AS A MFN-EP |
| MANAGED BY PERIPHERAL PROXY SUBSYSTEM | EP2:PF0' | | EP2:VF1 | EP2:VF2 | ONE VF IS GIVEN AS PF0 AND OTHERS AS VF1 AND VF2 TO BE USED BY VMs IN HOST 1 |
| EP2:PF0' | EP2:VF1 | | EP2:VF2 | EP2:VF3 | SR-IOV EP0 DEVICE IS DIRECTLY ASSIGNED TO SR-IOV EP2 |

TABLE SHOWS THE VARIOUS WAYS SR-IOV EP0 CAN BE ASSIGNED TO EP2 AND EP3 FOR THE TOPOLOGY IN THE RIGHT

306

PCIe PERIPHERAL SHARING

CROSS-REFERENCE TO RELATED APPLICATION

This application is a continuation of U.S. patent application Ser. No. 18/186,524, filed Mar. 20, 2023, which is a continuation of U.S. patent application Ser. No. 17/073,925, filed Oct. 19, 2020, which claims priority to U.S. Provisional Application No. 62/956,374, filed Jan. 2, 2020, each of which is incorporated by reference herein in its entirety.

BACKGROUND

The demand for increased processing capability is never-ending. As vehicles become autonomous and industrial processes become ever more dependent on neural networking, the need for higher levels of processing capability is unabated. While significant strides have been made in integrating high-performance computing systems onto systems on a chip (SOC), there are still limits on such integration. There are also needs for sharing of peripheral devices between various of the SOCs. While the SOCs may include Ethernet capabilities and have PCIe® (Peripheral Component Interconnect Express) ports, sharing peripheral devices external to the SOCs has a number of problems. Use of Ethernet for sharing has significant overhead issues for the involved devices and has a complicated system configuration. While PCIe has the capability to share peripheral devices between systems with individual root controllers, that sharing brings with it many difficulties for the peripheral devices and intervening components. These difficulties have limited the availability and deployment of shared PCIe peripheral devices, resulting in greater difficulty in combining high-performance SOCs and shared peripheral devices.

SUMMARY

In an example, a controller comprises first and second endpoint interfaces; and a single root controller interface configured to couple to a peripheral device that includes a physical function and a plurality of virtual functions associated with the physical function. The controller is configured to present through the single root controller interface: a first subset of the plurality of virtual functions through a first cloned instance of the physical function at the first endpoint interface; and a second subset of the plurality of virtual functions through a second cloned instance of the physical function at the second endpoint interface.

In an example, a controller comprises a single root controller interface configured to couple to a peripheral device that includes a physical function and a plurality of virtual functions; a first endpoint interface including a first cloned instance of the physical function and multiple virtual functions; a second endpoint interface including a second cloned instance of the physical function; and a virtualization unit. The virtualization unit is configured to map through the single root controller interface: a first virtual function of the plurality of virtual functions to one of the first cloned instance of the physical function, the second cloned instance of the physical function, and the multiple virtual functions. The virtualization unit may be further configured to map through the single root controller interface: a second virtual function of the plurality of virtual functions to another of the first cloned instance of the physical function, the second cloned instance of the physical function, and the multiple virtual functions Other aspects include methods that may be implemented to perform the functionality of the controllers described above.

This allows an SR-IOV peripheral device or a multi-function peripheral device to function as a multiple root I/O virtualization (MR-IOV) peripheral device so that a multi-root domain can be developed without the need for hard to find MR-IOV peripheral devices and multi-root aware (MRA) switches.

BRIEF DESCRIPTION OF THE DRAWINGS

For a detailed description of various examples, reference will now be made to the accompanying drawings in which:

FIG. 6 is a flowchart of operations of the peripheral proxy device of FIG. 3.

FIG. 7 is a block diagram illustrating one example of the PCIe registers in the example of FIG. 3.

FIG. 8 is a block diagram illustrating one example of data transfer operations from a peripheral device to the hosts in the example of FIG. 3.

FIG. 11 is a diagram illustrating possible configurations of an example system.

DETAILED DESCRIPTION

Figure 1:
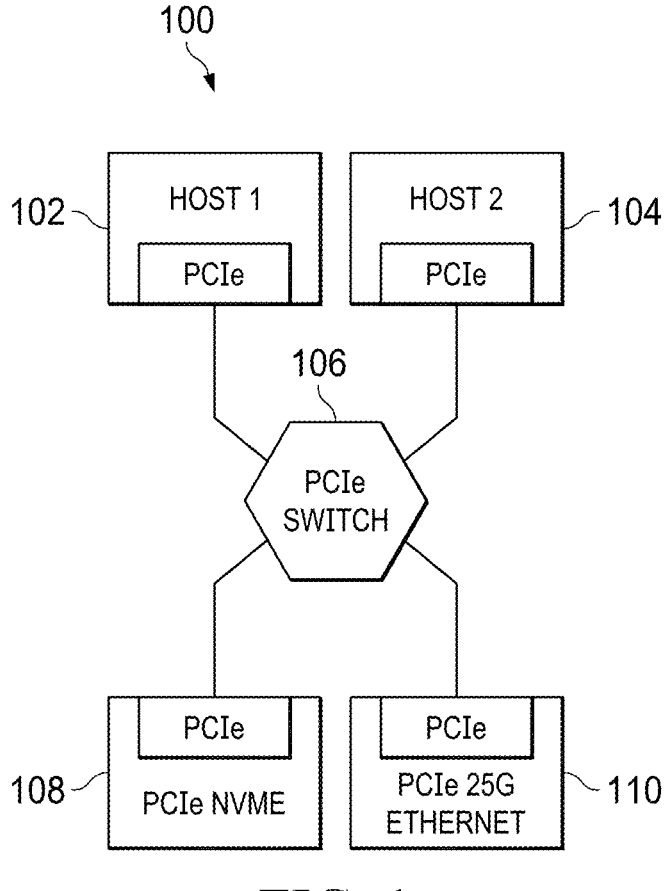
FIG. 1 is a high-level block diagram of two hosts sharing two peripheral devices using PCIe.

Referring now to FIG. 1, a computer system 100 is illustrated that is one example of a configuration with a host 1 102 and a host 2 104 connected to a PCIe switch 106, which in turn has a PCIe NVM Express™ (NVMe™) memory 108 and a PCIe 25G Ethernet network controller 110 connected to the PCIe switch 106. This configuration ideally allows host 1 102 and host 2 104 to access the NVMe memory 108 for shared memory storage and utilize the 25G Ethernet network controller 110 to access external systems at high speed. In practice, however, such a configuration is not as simple as it appears in FIG. 1. Problems develop because of the ability of PCIe devices to be shared by multiple root controllers. A host, such as host 1 102 and host 2 104, has a PCIe root controller to act as the top of the PCIe tree or network. PCIe provides two methods of sharing peripheral devices. The first is referred to as single root I/O virtualization (SR-IOV). The second is referred to as multiple root I/O virtualization (MR-IOV) and devices are multiple root aware (MRA). SR-IOV allows multiple virtual machines and the host operating system or hypervisor contained on a physical processor chip that operate through a single PCIe root controller to access the shared peripheral device. The shared peripheral device presents a physical function and multiple virtual function register sets at the PCIe interface. Each of the virtual machines or cores is assigned a virtual function or multiple virtual functions, while the physical function is assigned to the operating system or hypervisor. However, SR-IOV is not useful when two hosts, each containing a PCIe root controller, must share the same PCIe peripheral device. For multiple hosts with multiple root controllers to share a PCIe peripheral device, an MR-IOV peripheral device may be used, provided any intervening PCIe switches are also compliant with MR-IOV. While there are numerous SR-IOV enabled peripheral devices, there are very few MR-IOV enabled peripheral devices and very few MR-IOV switches. This is because of the added complexity that is required in each of the device peripheral devices and the switches. To be MR-IOV compliant, an MRA PCIe switch must be aware of the address spaces used by the hosts to properly route transactions. MR-IOV compliant peripheral devices may have more complicated interfaces to provide a basic function and to present multiple virtual endpoints, each virtual endpoint having both a physical function and virtual functions. These additional requirements have limited the availability of MR-IOV compliant switches and peripheral devices.

Figure 2:
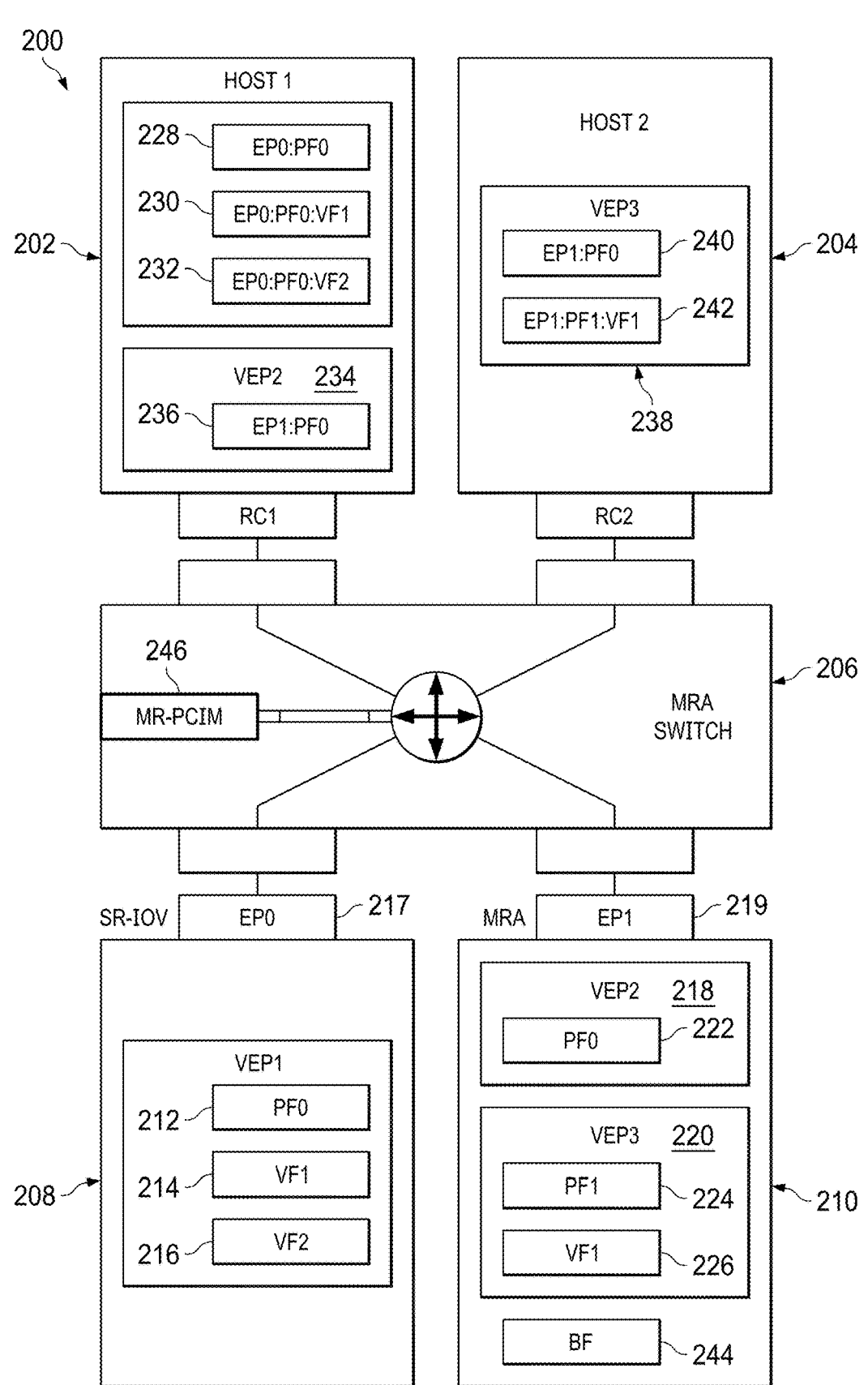
FIG. 2 is a more detailed block diagram of FIG. 1.

FIG. 2 is an example of a computer system 200 which contains host 1 202 and host 2 204 connected to an MRA PCIe switch 206, which is MR-IOV compliant. An SR-IOV peripheral device 208 is connected to the MRA PCIe switch 206. This SR-IOV peripheral device 208 can only be utilized by one of the two hosts 202, 204. An MR-IOV peripheral device 210 is connected to the MRA PCIe switch 206 and can be utilized by both hosts 202, 204. The SR-IOV peripheral device 208 presents a physical function (PF) zero (PF0) 212 and two virtual functions (VFs), VF1 214 and VF2 216 at the endpoint (EP) PCIe interface EP0 217. In contrast, the MR-IOV peripheral device 210 presents a basic function (BF) 244 used to manage the multiple root features of the MR-IOV peripheral device 210 and two virtual endpoints (VEP), VEP2 218 and VEP3 220 at EP1 219. VEP2 218 presents PF0 222, while VEP3 220 presents PF1 224 and VF1 226. In the illustrated embodiment example host 1 202 has control of the SR-IOV peripheral device 208 and has illustrated module 228 to interact with PF0 212, module 230 to interact with VF1 214 and module 232 to interact with VF2 216. Host 1 202 also has control of VEP2 218 and has a module 236 to interact with PF0 222. Host 2 204 has control of VEP3 220 and has modules 240 to interact with PF1 224 and 242 to interact with VF1 226. The MRA PCIe switch 206 includes a multi-root PCI manager (MR-PCIM) 246, which is responsible for discovering and configuring the virtual hierarchies within the multi-root topology, in the indicated example, just the MR-IOV peripheral device 210. The MRA PCIe switch 206 manages the multi-root aspects, so that the host 1 202 and host 2 204 just see SR-IOV, multi-function or single function peripheral devices.

Figure 3:
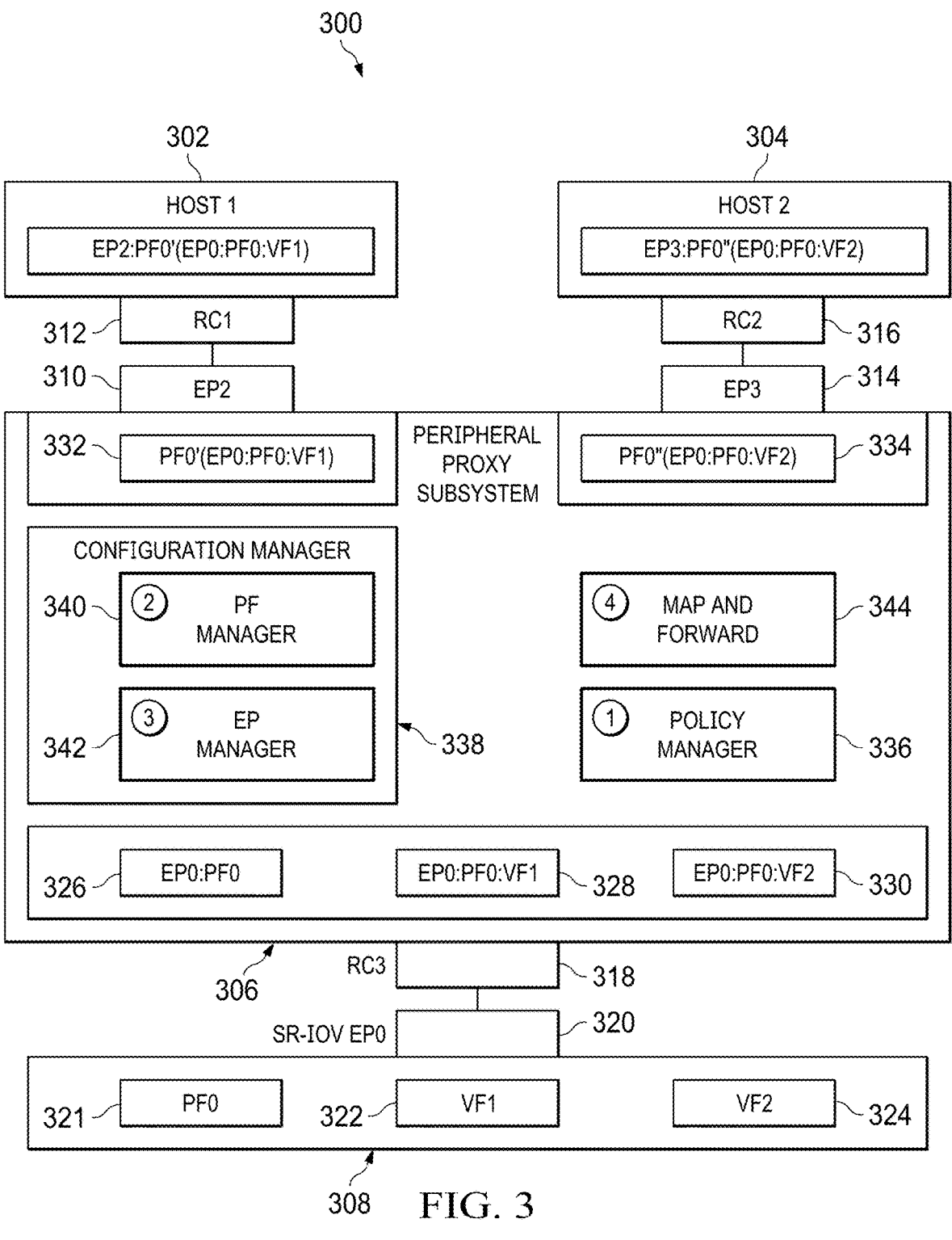
FIG. 3 is a block diagram of one example for sharing SR-IOV peripherals.

FIG. 3 illustrates one example computer system 300 which provides for multiple hosts with individual root controllers to share an SR-IOV peripheral device. Host 1 302 and host 2 304 are connected to a peripheral proxy subsystem 306. The peripheral proxy subsystem 306 is connected to an SR-IOV peripheral device 308. The peripheral proxy subsystem 306 in FIG. 3 provides an PCIe endpoint interface EP2 310 to cooperate with a root controller (RC) interface RC1 312 of host 1 302. The peripheral proxy subsystem 306 also provides an PCIe endpoint interface EP3 314 to cooperate with the root controller PCIe interface RC2 316 of host 2 304. The peripheral proxy subsystem 306 provides a root controller PCIe interface RC3

318 which cooperates with an PCIe endpoint interface EP0 320 on the SR-IOV peripheral device 308, which includes PF0 321, VF1 322 and VF2 324. These are controlled by RC3 318 in the peripheral proxy subsystem 306. The peripheral proxy subsystem 306 has modules 326 for interacting with the PF0 321, 328 for interacting with VF1 322 and 330 for interacting with VF2 324. The peripheral proxy subsystem 306 presents a first cloned instance of PF0 321 designated PF0' 332 at EP2 310 coupled to RC1 312. In the example of FIG. 3, PF0' 332 is VF1 322 of the peripheral device 308 presented by the peripheral proxy subsystem 306 as a PCIe endpoint physical function. Similarly, EP3 314 presents a second cloned instance of PF0 312 designated PF0" 334, which is VF2 324 of the peripheral device 308 in the example of FIG. 3. In this way, the virtual functions of the peripheral device 308 can be arbitrarily divided among the cloned instances, PF0' 332 and PF0" 334, and each of the cloned instances of the physical functions present an independent subset of the virtual functions.

The peripheral proxy subsystem 306 includes various manager modules. A policy manager 336 stores the configuration allocation information for the particular physical and virtual functions of the attached peripheral devices to the various attached hosts. A configuration manager 338 includes a physical function manager 340 which manages configuration of PF0 321 of the peripheral device 308. An endpoint manager 342 is contained in the configuration manager 338 and performs the remainder of the endpoint management functions to allow the hosts to identify the shared peripheral device and to be interrupted by the shared peripheral device. A map and forward module 344 manages the memory mapping contained in the peripheral proxy subsystem 306 and the forwarding routes for data.

Figure 4:
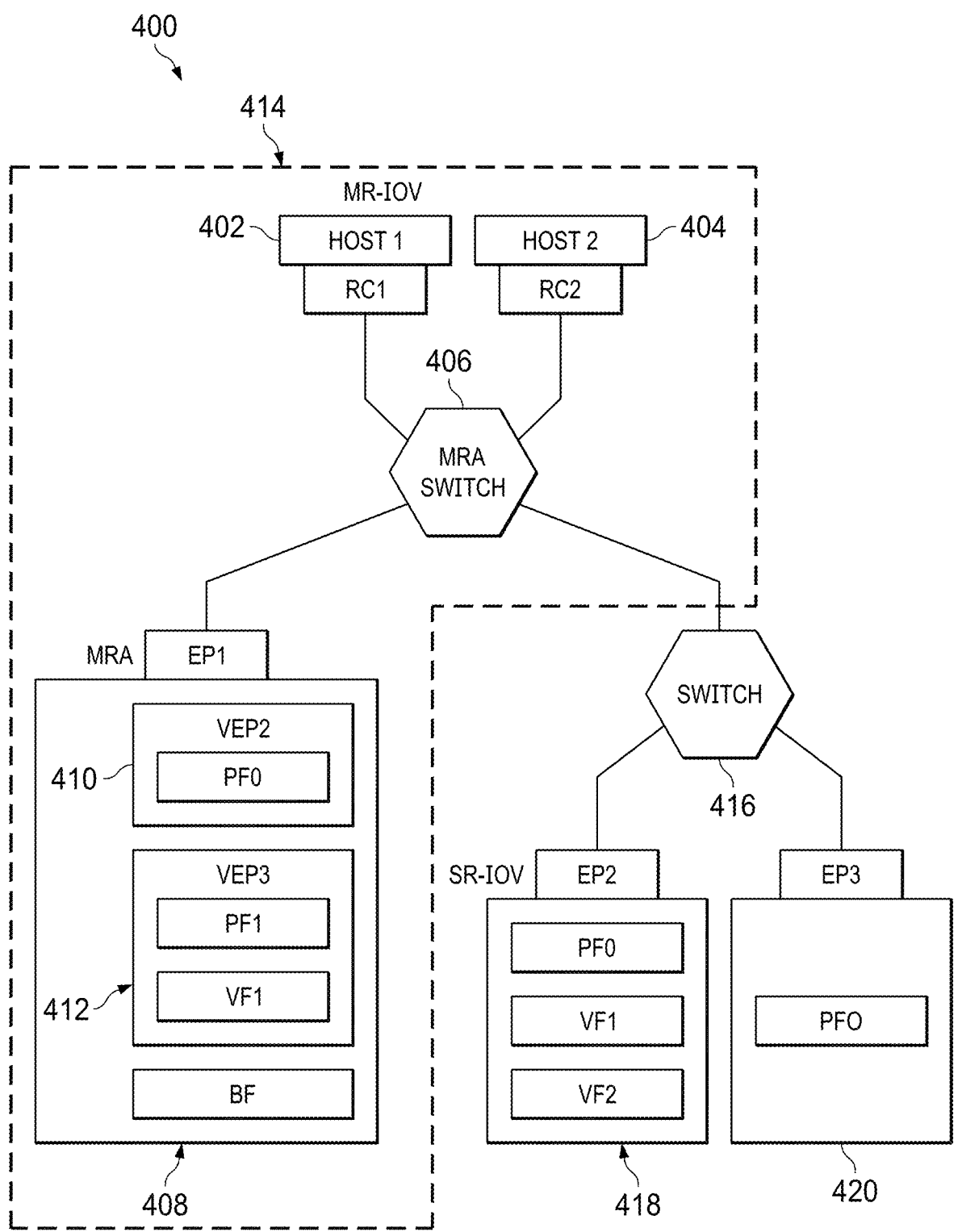
FIG. 4 is a block diagram of a more complex example according to FIG. 2.

FIG. 4 illustrates an example of a more complex multi-root PCIe system 400. A host 1 402 and a host 2 404 are connected to an MRA PCIe switch 406. An MR-IOV peripheral device 408 is connected to the MRA PCIe switch 406 and presents two virtual endpoints VEP2 410 and VEP3 412. This combination creates a multi-root domain 414. A non-MRA PCIe switch 416 is connected to the MRA PCIe switch 406 and has connected to it an SR-IOV peripheral device 418 and a single function peripheral device 420. The MR-IOV peripheral device 408 is shared between the host 1 402 and host 2 404, whereas the SR-IOV peripheral device 410 and the single function peripheral device 420 are assigned to either host 1 402 or host 2 404 as they are not multi-root aware.

Figure 5:
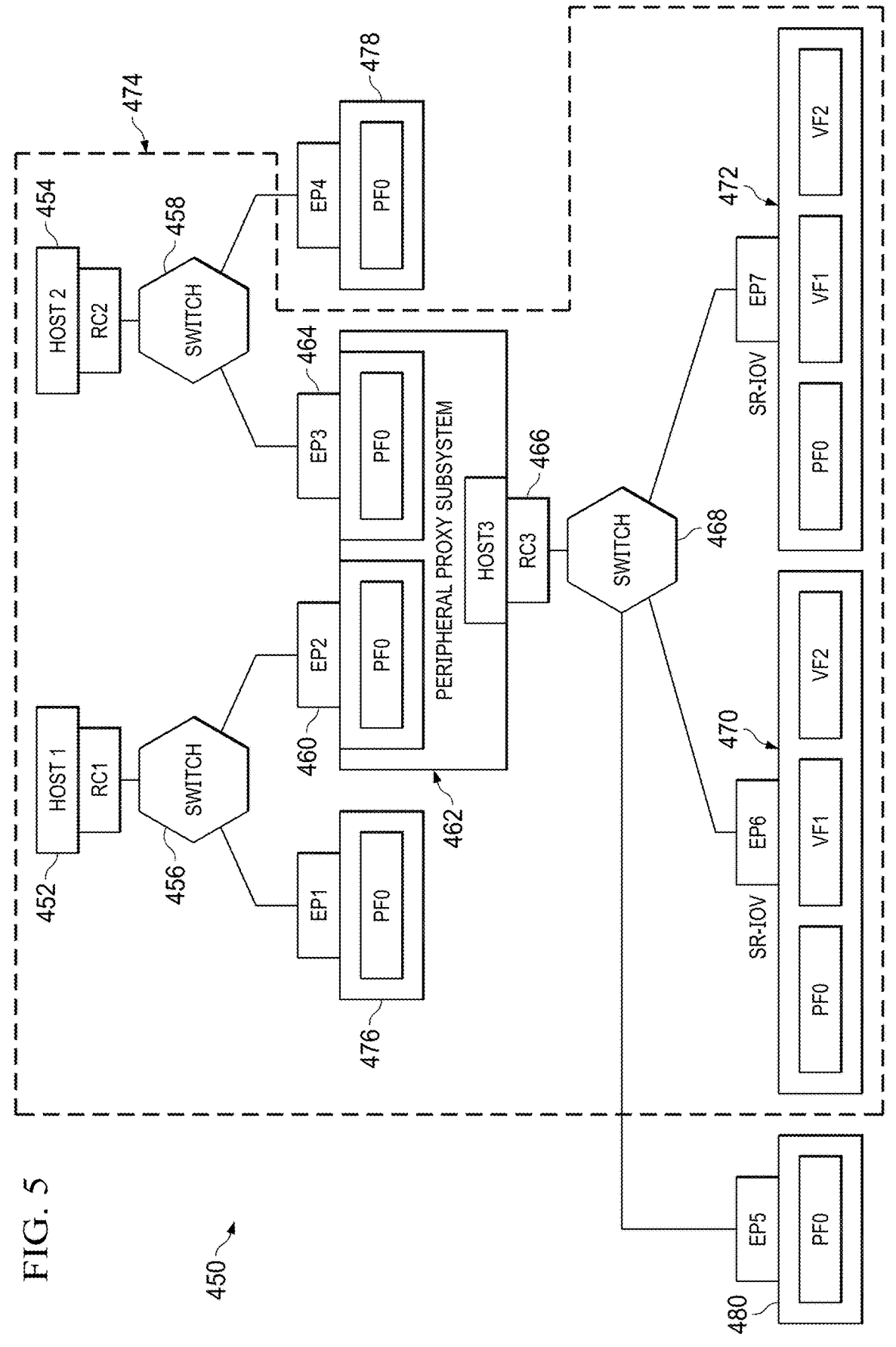
FIG. 5 is a block diagram of a more complex example according to FIG. 3.

FIG. 5 is an example of a more complex system 450 including a peripheral proxy subsystem. Host 1 452 is connected to a first PCIe switch 456, the PCIe switch 456 not being multi-root aware. Host 2 454 is connected to a second PCIe switch 458. PCIe switch 456 is connected to an PCIe endpoint interface EP2 460 of a peripheral proxy subsystem 462, while the PCIe switch 458 is connected to an PCIe endpoint interface EP3 464. Root controller interface RC3 466 of the peripheral proxy subsystem 462 is connected to a PCIe switch 468. A first SR-IOV peripheral device 470 is connected to the PCIe switch 468. A second SR-IOV peripheral device 472 is also connected to the PCIe switch 468. This collection of devices together forms a multi-root domain 474 in the system 450. Contrasting it with the multi-root domain 414 of FIG. 4, it is noted that none of the host, switch, or peripheral devices in the multi-root domain 474 are multi-root aware devices. However, peripheral proxy subsystem 462 allows more commonly available SR-IOV peripheral devices and normal PCIe switches are used, and multi-root operation is still provided. A single function peripheral device 476 is connected to PCIe switch 456, while a single function peripheral device 478 is connected to PCIe switch 458 and a single function peripheral device 480 is connected to PCIe switch 468. In this configuration the virtual functions of the SR-IOV peripheral devices 470, 472 can be shared between the hosts 452 and 454. The single function peripheral device 480 can be utilized by either host 1 452 or host 2 454. Single function peripheral device 476 is dedicated to host 1 452, while single function peripheral device 478 is dedicated to host 2 454. With the use of the peripheral proxy subsystem 462, a multi-root domain 474 is developed using the more commonly available SR-IOV devices and non-multi-root aware switches and without the use of multi-root aware devices.

Referring now to FIG. 6, one example of initialization of the peripheral proxy subsystem 306 of FIG. 3 is illustrated. In operation 602, hardware link negotiation between RC3 318 and EP0 320 is performed. In operation 604, a PCIe software stack that is present in the peripheral proxy subsystem 306 enumerates PF0 321. In operation 606, a PCIe driver in the physical function manager 340 is bound to PF0 321 so that the SR-IOV peripheral device 308 can be configured. In operation 608, the policy manager 336 determines the number of virtual functions in SR-IOV peripheral device 308 to enable. In operation 610, the physical function manager 340 writes this number of virtual functions into the peripheral device registers of PF0 321. In operation 612, the PCI software stack enumerates the virtual functions of EP0 320. In operation 614, a PCIe endpoint function driver in the endpoint manager 342 is bound to EP2 310 and EP3 314 to allow initialization of the endpoint instances connected to the host 1 302 and host 2 304 with the appropriate virtual function configuration space data. In operation 616, the policy manager 336 determines the endpoint instances that are connected to hosts and the virtual functions that each endpoint instance should be initialized with. In some examples, a physical function also provides a function beyond just management, and in those cases the physical function may also be mapped to an endpoint instance. In yet other examples, as discussed below, a peripheral device is directly assigned to an endpoint instance. In operation 618, the endpoint manager 342 initializes the endpoint instances with the virtual function configuration space data, and/or the relevant portions of the physical function configuration space used to provide the functions of a physical function. For example, if VF1 322 is to be mapped to EP2 310, the values in the VF1 322 configuration space data are copied to EP2 310 to present as the configuration space data for the appropriate cloned function, such as PF0' 332 or a virtual function. Mapping of basic physical function data is discussed below. In operation 620, the map and forward module 344 configures various translation lookaside buffers (TLBs) and transaction forwarders in the peripheral proxy subsystem 306 to perform translation of memory addresses in memory transactions and to forward those memory transactions from the virtual functions in the SR-IOV peripheral device 308 to either EP2 310 or EP3 314. In operation 622, hardware link negotiation is performed between RC1 312 and EP2 310 and between RC2 316 and EP3 314. In operation 624, normal software execution begins in RC1 312 and RC2 316. With this, the peripheral proxy subsystem 306 is initialized and ready for operation.

A routing mechanism in the peripheral proxy subsystem 306 provides a way for transactions to be forwarded from virtual functions VF1 322 and VF2 324 in SR-IOV peripheral device 308 to host 1 302 and host 2 304, respectively, in one direction and from host 1 302 and host 2 304 to VF1

322 and VF2 324, respectively, in SR-IOV peripheral device 308 in the other direction. The peripheral proxy subsystem provides peripheral virtualization unit (PVU) (812), virtual ID map logic 810, and outbound address translation units 818 and 820 in the routing mechanism for transactions to be forwarded from virtual function VF1 322 and VF2 324 in SR-IOV peripheral device 308 to host 1 302 and host 2 304, respectively. The peripheral proxy subsystem provides base address registers, inbound and outbound address translation units (described below) in the routing mechanism for transactions to be forwarded from host 1 302 and host 2 304 to VF1 322 and VF2 324, respectively, in the SR-IOV peripheral device 308.

FIG. 7 illustrates the register configuration performed by the endpoint manager 342. The registers contained in the cloned instances PF0' 332 and PF0" 334 of the peripheral proxy subsystem and the corresponding PF0 321 of the device to be shared are illustrated. The endpoint manager 342 initializes the configuration space of the endpoint instances EP2 310 and EP3 314. The endpoint manager 342 initializes device identification capabilities in PF0' 332 and PF0" 334 with values from the standard configuration space headers and SR-IOV capability in the extended configuration space of EP0 320. The endpoint manager 342 need not initialize any other capabilities present in PF0' 332 and PF0" 334 that depend on the capabilities of the PF0 321 in the EP0 320 except for MSI capabilities, as that operation is performed in step 618 if necessary. As to the MSI capabilities, certain fields, such as the multiple message capable field, which indicates the number of desired interrupt vectors, are initialized based on the respective physical or virtual function of the SR-IOV peripheral device 308 being mapped. If the physical function being presented to the root controller is mapped from a virtual function, then the VF configuration space data will have been copied to the PF configuration space being presented in step 618.

FIG. 8 illustrates PCI memory transfers from the SR-IOV peripheral device 308 to host 1 302 and host 2 304. When VF1 322 and VF2 324 are enumerated, internal addresses are reserved or assigned. The PCIe driver of host 1 302 includes a memory buffer MEM(A) 802 and the PCIe driver of host 2 304 includes a memory buffer MEM(B) 804. The PCIe drivers in host 1 302 and host 2 304 initialize the buffer addresses of their memory buffers MEM(A) 802 and MEM (B) 804 in the respective buffer address register 806 of VF1 322 and buffer address register 808 of VF2 324. Thus, VF1 322 includes access to memory buffer MEM(A) 802 while VF2 324 includes access to memory buffer MEM(B) 804. With the host addresses now known, entries in TLB 814 and TLB 816 can be programmed to translate from the host addresses to the reserved internal addresses and the destination endpoint. Similarly, outbound address translation units 818 and 820 are programmed to translate from the internal addresses back into host addresses. The above steps are initialization steps and do not have to be performed for each transaction. VF1 322 and VF2 324 each have a requester ID developed during initialization operations. The requester ID (ReqID) is used in the transactions to identify the particular PF or VF. When a PF or VF provides a memory transaction, the memory transaction includes a requester ID and the host memory address. For example, a memory transaction from VF1 322 will include a requester ID of 01x01 and address in the buffer memory MEM(A) 802. The peripheral proxy subsystem 306 includes virtual ID map logic 810. The virtual ID map logic 810 converts a requester ID in a transaction from a VF into a virtual ID (virtID) and forwards the transaction to the PVU 812. The PVU 812 includes the TLBs 814 and 816, one per virtID or VF. The entries in the TLBs 814 and 816 convert the memory addresses in a transaction to an internal address of the peripheral proxy subsystem 306 and provide the transaction to a designated endpoint. The selection of a TLB based on the virtID and the provision of the converted transaction to a designated endpoint act together to route the transaction to the proper endpoint. TLB 814 contains the translation lookaside buffer entries for virtID0, which corresponds to VF1 322, while TLB 816 contains the translation lookaside buffer entries for virtID1, which corresponds to VF2 324. When the PVU 812 receives a transaction from the virtual ID map logic 810, the virtID is used to select the appropriate TLB 814 or 816. The TLB 814, 816 translates the host address in the transaction to a peripheral proxy subsystem 306 internal outbound address for the relevant endpoint EP2 310 or EP3 314. The transaction with the now converted address is provided to a respective outbound address translation unit (ATU) 818 in PF0' 332 or outbound ATU 820 in PF0" 334. The outbound ATU 818 in PF0' 332 or outbound ATU 820 in PF0" 334 translates the internal outbound address back into the appropriate host address for provision of the transaction to the particular host and provides an appropriate ReqID for the particular function based on the internal address. After this final transaction address translation, the transaction is provided from EP2 310 to RC1 312 for host 1 302 or from EP3 314 to RC2 316 for host 2 304.

To summarize, for a memory operation from the peripheral device 308 to host 1 302 or host 2 304, the peripheral device 308 provides a transaction with a ReqID of the appropriate function, such as PF0 321, VF1 322 or VF2 324, and a host memory address. The ReqID is converted to a virtID in the virtual ID map logic 810. A TLB in the PVU 812 translates the host memory address into an internal outbound memory address. An outbound ATU translates the internal outbound memory address back to the host memory address and the transaction is provided to the host. In this way, each of the cloned physical functions PF0' 332 and PF0" 334 appears, to its respective host, to be a function of a separate and independent SR-IOV peripheral device assigned only to the respective host.

Figure 9:
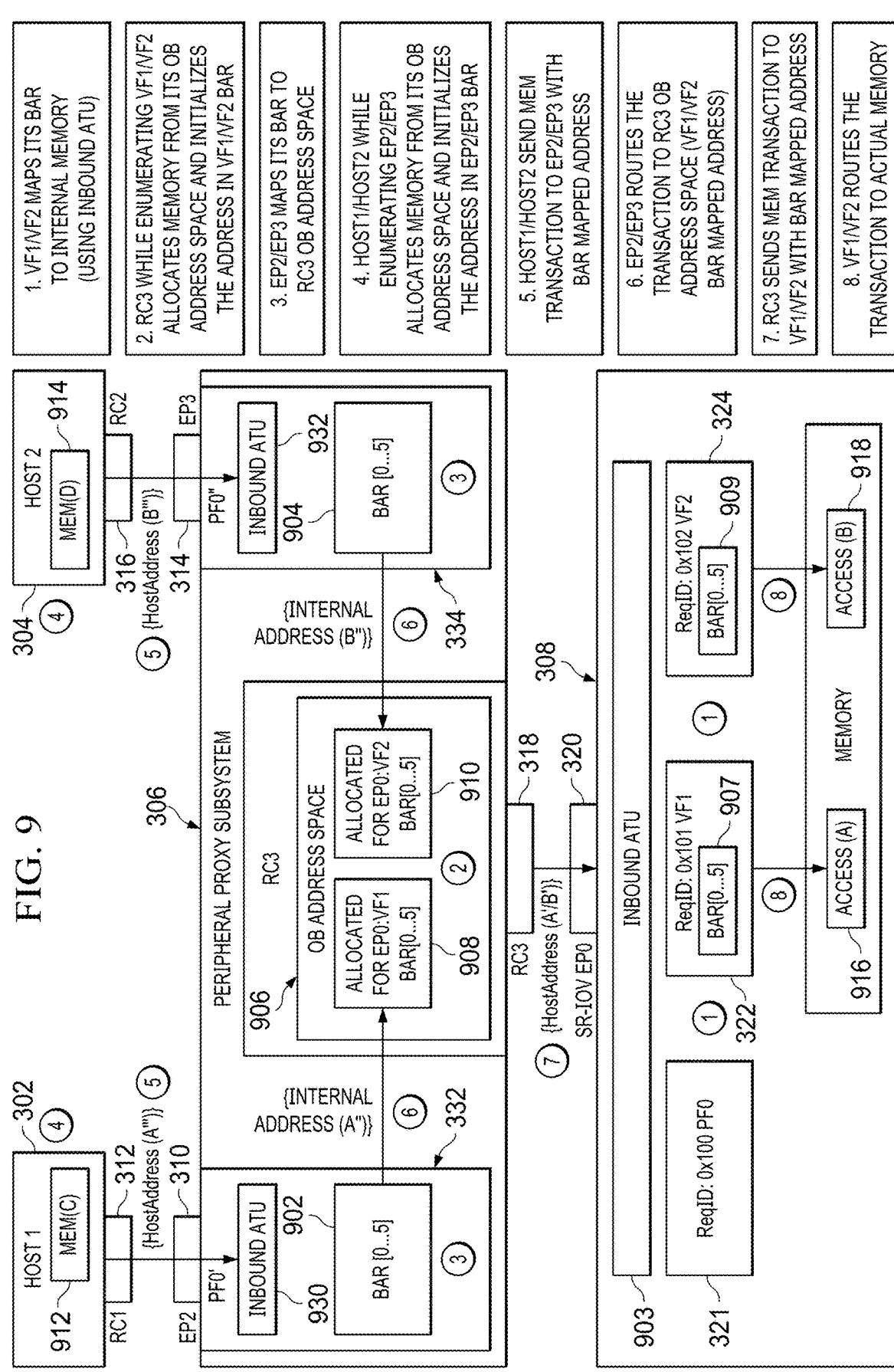
FIG. 9 is a block diagram illustrating one example of data transfer operations from the hosts to the peripheral device in the example of FIG. 3.

FIG. 9 illustrates memory transfer operations from a host to the peripheral device. At initialization, each virtual function maps its base address registers (BARs) to internal memory addresses using an inbound ATU. VF1 322 has BARs 907 which map to peripheral device 308 internal memory locations Access(A) 916 using inbound ATU 903. VF2 324 has BARs 909 which map to internal memory locations Access(B) 918 using the inbound ATU 903. Next, during root controller enumeration of the virtual functions, memory is allocated from the outbound address space and initialized in the virtual function. RC3 318 allocates memory block 908 for the VF1 BARs 907 in the outbound address space 906. RC3 318 allocates memory block 910 for the VF2 BARs 909 in the outbound address space 906. RC3 318 sets the memory block 908 to access the BARs 907 and memory block 910 to access the BARs 909. Next, EP2 310 uses inbound ATU 930 and EP3 314 uses inbound ATU 932 to map their base address registers 902, 904 to outbound address blocks 908, 910. Following this, the host 1 302 and host 2 304 allocate MEM(C) 912 and MEM(D) 914, respectively, the host outgoing memory buffers, and initialize those addresses in the PF0' 332 BARs 902 and PF0" 334 BARs 904. This completes initialization of the peripheral proxy subsystem 306 and the peripheral device 308 to receive a memory write transaction.

To perform a write operation, host 1 302 uses RC1 312 and provides a memory transaction to EP2 310 using the addresses mapped in MEM(C) 912. EP2 310 obtains the transaction and translates the host 1 302 address into internal addresses in the memory block 908 allocated for VF1 322 and provides the transaction to RC 318. RC3 318 provides the transaction to EP0 320. The inbound ATU 903 translates the addresses according to BARs 907 and provides the transaction to the designated memory location Access(A) 916. Similarly, host 2 304 uses RC2 316 and provides a memory transaction to EP3 314 using the addresses mapped in MEM(D) 914. EP3 314 obtains the transaction and translates the host 2 304 address into internal addresses in the memory block 910 allocated for VF2 324 and provides the transaction to RC3 318. RC3 318 provides the transaction to EP0 320. The inbound ATU 903 translates the addresses according to BARs 909 and provides the transaction to the designated memory locations Access(B) 918. The mapping of the internal addresses to the BARs of the virtual functions of the peripheral device and the mapping of the inbound ATUs to those internal addresses acts to route a host to peripheral device transaction to the proper physical or virtual function in the peripheral device.

Figure 10:
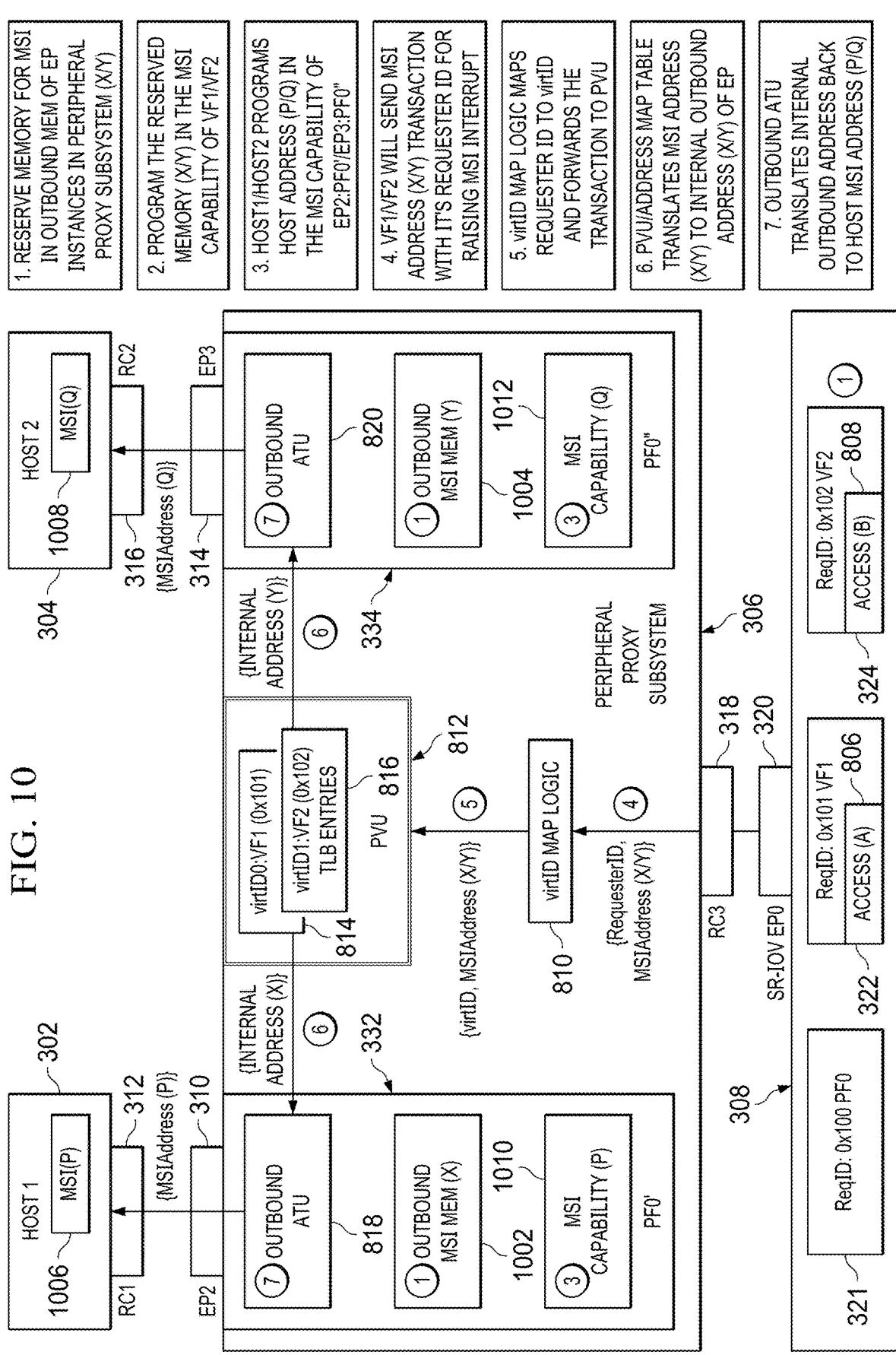
FIG. 10 is a block diagram illustrating one example of MSI operation in the example of FIG. 3.

PCIe uses message signaled interrupts (MSIs). With MSI, interrupt messages are provided to host memory locations. FIG. 10 illustrates one example of MSI operations. Host 1 302 has a memory block MSI(P) 1006 reserved for MSI use and host 2 304 has a memory block MSI(Q) 1008 reserved for MSI use. EP2 310 includes an outbound MSI memory block (X) 1002, while EP3 314 includes an outbound MSI memory block (Y) 1004. The addresses of the outbound MSI memory blocks (X) 1002 and (Y) 1004 are programmed into the MSI registers of VF1 322 and VF2 324, respectively. The host 1 302 programs the address of memory block MSI(P) 1006 into the MSI registers of PF0' 332, while the host 2 304 programs the address of memory block MSI (Q) 1008 into the MSI registers of PF0" 334. This completes the initialization operations. When VF1 322 or VF2 324 desires to send an MSI transaction, the virtual function provides a transaction with its requester ID and the address reserved in the outbound MSI memory block (X) 1002 or (Y) 1004, respectively. The virtual ID map logic 810 maps the requester ID to a virtual ID and provides the transaction to the PVU 812. The PVU 812 translates the MSI address to an internal outbound address, if necessary and routes the MSI transaction. The outbound ATU 818, 820 translates the internal outbound MSI address to the host memory block MSI(P) 1006 or MSI (Q) 1008 and EP2 310 or EP3 314 provides the transaction to the host 1 302 or host 2 304.

FIG. 11 illustrates the flexibility of the mapping of physical functions and virtual functions to the endpoints of the peripheral proxy subsystem 306 and thus to the hosts. In a first example, the peripheral proxy subsystem 306 manages PF0 321, VF1 322 is mapped to PF0' 332, VF2 324 is mapped to PF0" and VF3 1108 is mapped to VF1 1104 of PCIe endpoint 310. This provides MR-IOV operation of the SR-IOV peripheral device 308. In a second example, PF0 321 is managed by the peripheral proxy subsystem 306, with VF1 322 mapped as PF0', VF2 324 mapped as PF1 1102 and VF3 1008 mapped as PF2 (not shown). This maps all virtual functions to host 1 302 as physical functions, so that peripheral device 308 appears to be a multifunction PCIe endpoint. In a third example, PF0 321 is managed by the peripheral proxy subsystem 306, VF1 322 is mapped to PF0' 332, VF2 324 is mapped to VF1 1004 and VF3 1008 is mapped to VF2 1106. This allows different virtual machines in host 1 302 to utilize the three virtual functions as normal in SR-IOV operation. In a fourth example, the SR-IOV peripheral device 308 is directly assigned to EP2 310, so that PF0 321 maps to PF0' 332, VF1 322 maps to VF1 1104, VF2 324 maps to VF2 1106 and VF3 1108 maps to VF3 (not shown) of PCIe endpoint 310. This flexibility in mapping is accomplished by the routing performed by the PVU 812 and the TLBs for peripheral device memory transfer and MSI operations and the internal memory space allocations and BAR values for host memory transfer operations in conjunction with the copying of PF and VF configuration space data to present the desired functions. These are just four examples of the flexibility of mapping physical functions and virtual functions using the peripheral proxy subsystem 306 and other mappings can readily be performed.

Figure 12:
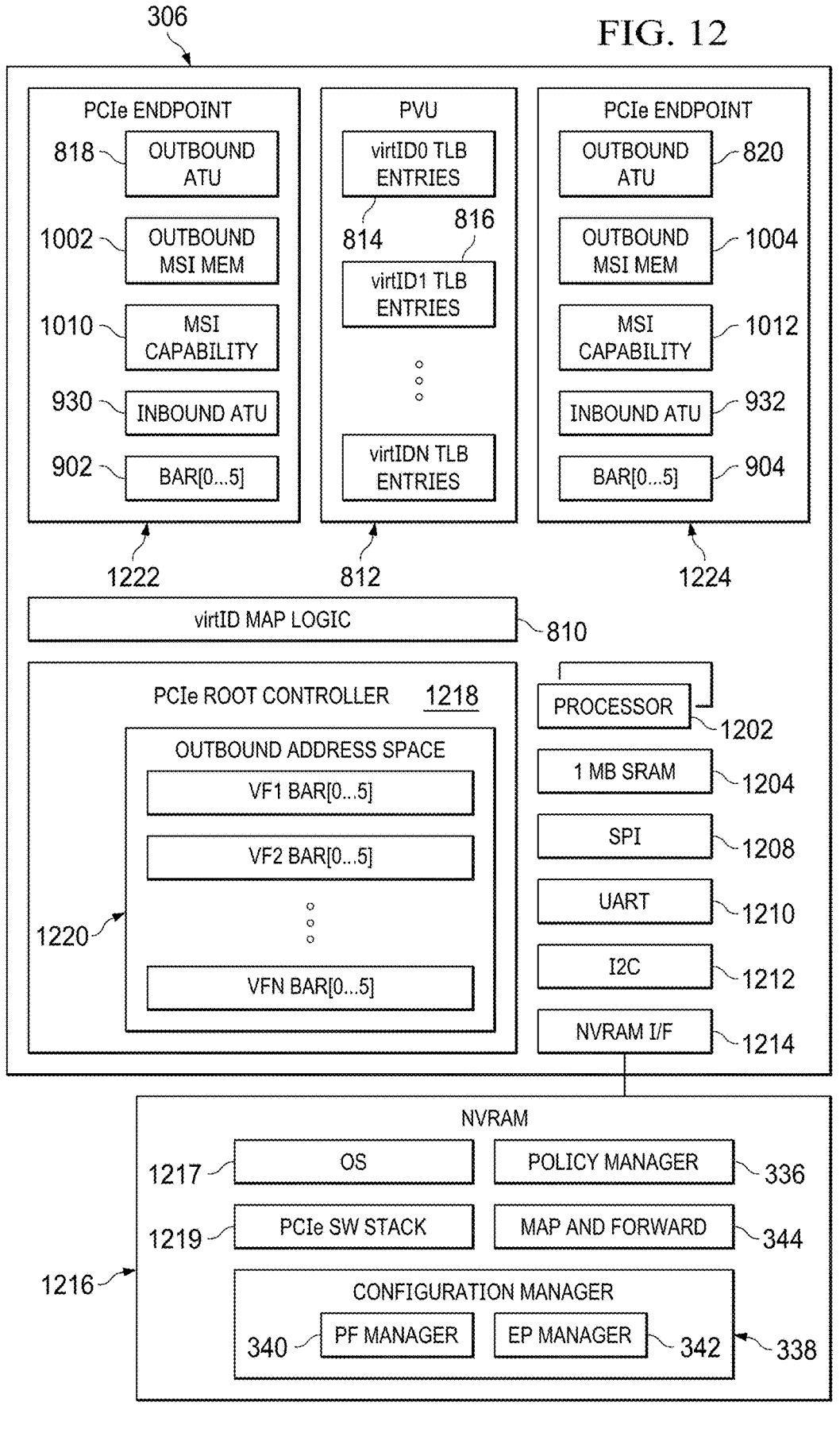
FIG. 12 is a hardware block diagram of one example of the peripheral proxy subsystem of FIG. 3.

FIG. 12 is a hardware block diagram of a peripheral proxy subsystem 306, such as that of FIG. 3. Processors 1202, such as ARM R5F cores, provide the basic processing function in the peripheral proxy subsystem 306. SRAM 1204 is provided as operating memory and to act as the memory blocks used by the various devices internal to the peripheral proxy subsystem 306. Various I/O ports, such as SPI 1208, UART 1210 and I2C 212 are present to allow external communication with and management by other devices in a system. Alternatively, management of the peripheral proxy subsystem 306 could be performed through extended capabilities of a PF presented at one of the endpoints. A nonvolatile (NV) RAM interface 1214 is connected to a non-transitory NVRAM 1216 which contains the firmware modules used to provide the functions of the peripheral proxy subsystem 306. For example, the policy manager 336, the configuration manager 338 with its physical function manager 340 and endpoint manager 342, and the map and forward module 344 are contained in NVRAM 1216 to be executed by the processors 1202. An operating system and/or hypervisor 1217 are stored in the NVRAM 1216, as is the PCIe software stack 1219 mentioned previously.

A first PCIe endpoint 1222 acts as an endpoint such as EP2 310 and includes the outbound ATU 818, outbound MSI memory 1002, the MSI capability register 1010, inbound ATU 930 and the base address registers 902. A second PCIe endpoint 1224 is provided to act as a second endpoint, such as EP3 314, and includes outbound ATU 820, outbound MSI memory 1004, MSI capability registers 1012, inbound ATU 932 and the base address registers 904.

A PCIe root controller 1218 is present to act as the root controller for SR-IOV peripheral devices to be shared between hosts connected to PCIe endpoints 1222, 1224. An example of the PCIe root controller 1218 is RC3 318. The PCIe root controller 1218 includes outbound address space 1220, which includes the various virtual function base address register spaces. The virtual ID map logic 810 is provided, as is the PVU 812 with the various virtual ID TLBs 814 and 816 and others as needed. More endpoints and root controllers can be present on the peripheral proxy subsystem 306 than the two endpoints and one root controller illustrated in the various Figures. Each root controller and endpoint will operate as described above.

Multiple SR-IOV peripheral devices can be connected to the root controller of the peripheral proxy subsystem 306 and each is mapped and managed as described above.

Figure 13:
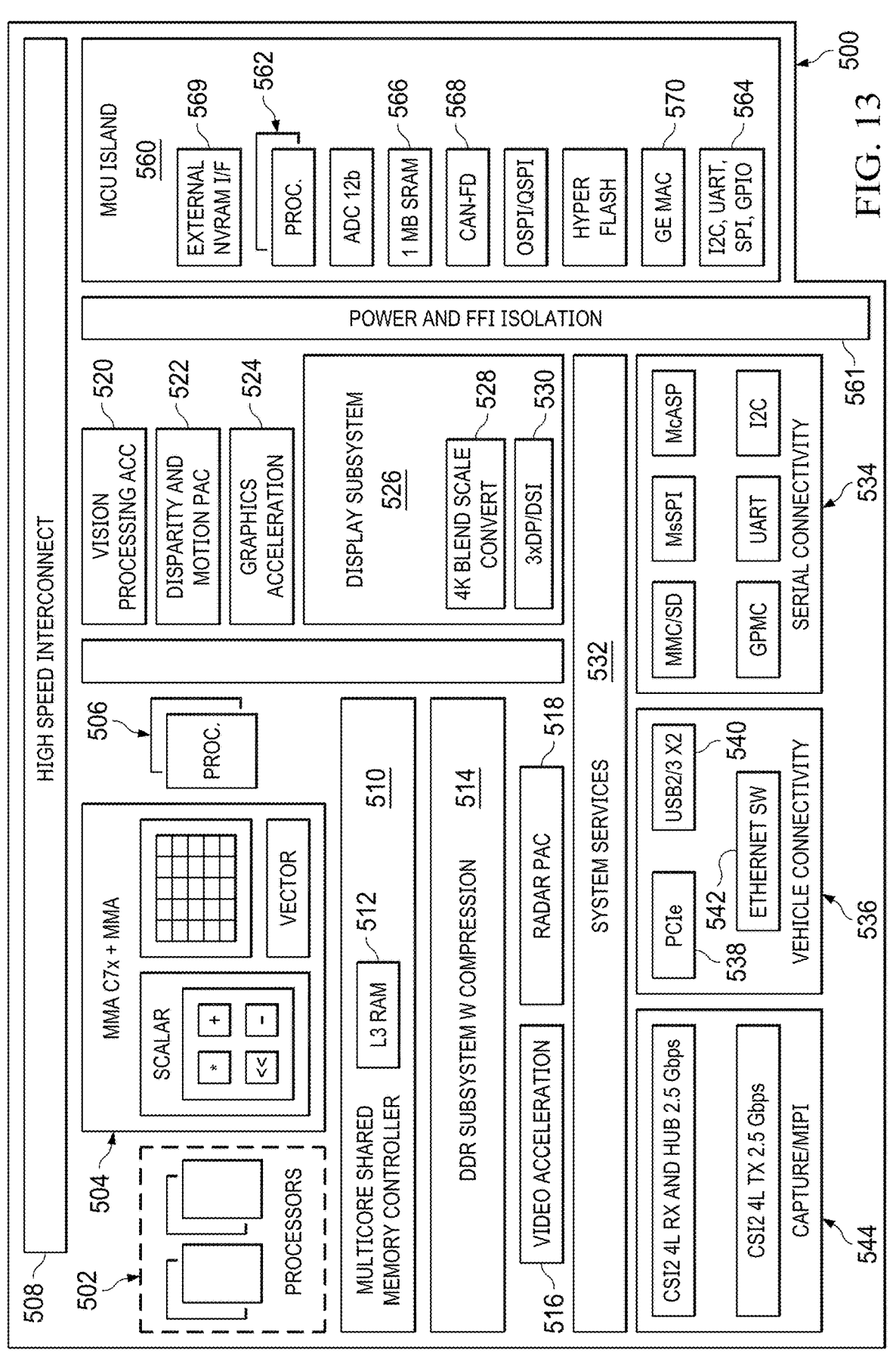
FIG. 13 is a hardware block diagram of one example of an SOC.

FIG. 13 is a block diagram of an exemplary SoC 500 that can form the hosts 1 and 2 302, 304. A series of more powerful microprocessors 502, such as ARM® A72 or A53 cores, form the primary general-purpose processing block of the SoC 500, while a digital signal processor (DSP) 504 provides specialized computing capabilities. Simpler microprocessors 506, such as ARM R5F cores, provide general control capability in the SoC 500. A high-speed interconnect 508 connects the microprocessors 502, DSP 504 and microprocessors 506 to various other components in the SoC 500. For example, a shared memory controller 510, which includes onboard memory or RAM 512, is connected to the high-speed interconnect 508 to act as the onboard RAM for the SoC 500. A DDR memory controller system 514 is connected to the high-speed interconnect 508 and acts as an external memory interface to external DRAM memory. A video acceleration module 516 and a radar processing accelerator (PAC) module 518 are similarly connected to the high-speed interconnect 508. A vision processing accelerator module 520 is connected to the high-speed interconnect 508, as is a depth and motion PAC module 522. A graphics acceleration module 524 is connected to the high-speed interconnect 508. A display subsystem 526 is connected to the high-speed interconnect 508 and includes conversion logic 528 and output logic 530 to allow operation with and connection to various video monitors if appropriate. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, USB block 540 and an Ethernet switch 542. A capture/MIPI module 544 includes a four-lane CSI-2 compliant transmit block 546 and a four-lane CSI-2 receive module and hub. Further details on the CSI-2 receive module and hub are provided below.

An MCU island 560 is provided as a secondary subsystem and handles operation of the integrated SoC 500 when the other components are powered down to save energy. A processor 562, such as one or more ARM R5F cores, operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568, an additional external communication interface, is connected to allow operation with a conventional CAN bus environment in a vehicle. An Ethernet MAC (media access control) block 570 is provided for further connectivity in the vehicle. Nonvolatile memory (NVM) is connected to the MCU ARM processor 562 through an external NVRAM interface 569.

This is an example host configuration and many other host configurations can be utilized.

While the use of virtID map logic to translate ReqIDs to virtIDs and TLBs to translate host memory addresses to internal memory addresses are described in the examples above, in other examples ReqIDs are used to route transactions from the peripheral device to the hosts and the virtID map logic is not needed. In yet other examples, an internal memory space is not used and the TLBs are not needed.

In the example described above, a TLB is provided for each VF in the peripheral device 308. In another example, only a single TLB is provided, but that TLB is extended to include the ReqID or virtID as lookup values and to provide the desired endpoint as an output value.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A controller comprising:
a first endpoint interface;
a second endpoint interface; and
a single root controller interface configured to couple to a peripheral device that includes a physical function and a plurality of virtual functions associated with the physical function;
wherein the controller is configured to present through the single root controller interface:
a first subset of the plurality of virtual functions through a first cloned instance of the physical function at the first endpoint interface; and
a second subset of the plurality of virtual functions through a second cloned instance of the physical function at the second endpoint interface,
the controller including virtual map logic configured to:
receive, a transaction from a virtual function of the plurality of virtual functions, the transaction including a request identification and a memory address of a first host associated with the first endpoint interface; and
convert the request identification to a virtual identification uniquely associated with the virtual function.

2. The controller of claim 1, wherein the first subset of the plurality of virtual functions and the second subset of the plurality of virtual functions are nonoverlapping.

3. The controller of claim 1, wherein the controller further comprises:
a set of control modules including a physical function control module for the physical function, and a plurality of virtual function control modules for the plurality of virtual functions, respectively.

4. The controller of claim 1, wherein the controller further includes a virtualization unit configured to:
translate the memory address into an internal address for the first endpoint interface.

5. The controller of claim 4, wherein the controller further includes an outbound translation unit coupled to the first endpoint interface and configured to translate the internal address for use by the first host.

6. A controller comprising:
a single root controller interface configured to couple to a peripheral device that includes a physical function and a plurality of virtual functions associated with the physical function;
wherein the controller is configured to present through the single root controller interface:
a first subset of the plurality of virtual functions through a first cloned instance of the physical function at the first endpoint interface;
a second subset of the plurality of virtual functions through a second cloned instance of the physical function at the second endpoint interface;
a first routing mechanism configured to:
present each virtual function of the first subset of the plurality of virtual functions through the first cloned instance of the physical function at the first endpoint interface; and present each virtual function of the second subset of the plurality of virtual functions through the second cloned instance of the physical function at the second endpoint interface; and
a second routing mechanism configured to:
transfer operations from a first host associated with the first endpoint interface to each virtual function of the first subset of the plurality of virtual functions; and
transfer operations from a second host associated with the second endpoint interface to each virtual function of the second subset of the plurality of virtual functions.

7. The controller of claim 1, wherein:
wherein the controller is configured to present through the single root controller interface:
another virtual function of the peripheral device to a virtual function of the first endpoint interface.

8. A controller comprising:
a single root controller interface configured to couple to a peripheral device that includes a physical function and a plurality of virtual functions;
a first endpoint interface including a first cloned instance of the physical function and multiple virtual functions;
a second endpoint interface including a second cloned instance of the physical function; and
a virtualization unit configured to:
assign a first subset of virtual functions of the plurality of virtual functions to the first endpoint interface for use by a first external device when coupled to the first endpoint interface and to assign a second subset of virtual functions of the plurality of virtual functions to the second endpoint interface for use by a second external device when coupled to the second endpoint interface, wherein the first and second subsets of virtual functions are mutually exclusive;
allow identification of the peripheral device by the first and second external devices when coupled to the first and second endpoints, respectively; and
map through the single root controller interface:
the first subset of virtual functions to the first cloned instance of the physical function, and the second subset of virtual functions to the second cloned instance of the physical function.

9. The controller of claim 8, wherein the virtualization unit comprises a policy manager configured to store configuration allocation information for the physical function and the plurality of virtual functions.

10. The controller of claim 8, wherein the first endpoint interface includes a set of multiple physical functions, and the virtualization unit is further configured to map through the single root controller interface:
a third subset of virtual functions of the plurality of virtual functions to one of the multiple physical functions of the first endpoint interface.

11. The controller of claim 8, wherein the virtualization unit is further configured to map through the single root controller interface:
a third subset of virtual functions of the plurality of virtual functions to one of the multiple virtual functions of the first endpoint interface.

12. A method comprising:
determining, by a controller, that a peripheral device is coupled to a root controller interface of the controller, wherein the peripheral device has a physical function and a plurality of virtual functions associated with the physical function;

creating a first set of address translation entries to map a first subset of the plurality of virtual functions to a first cloned instance of the physical function at a first endpoint interface of the controller;

presenting, at the first endpoint interface, the first subset of the plurality of virtual functions, using the first set of address translation entries and a first translation unit associated with the first endpoint interface;

creating a second set of address translation entries to map a second subset of the plurality of virtual functions to a second cloned instance of the physical function at a second endpoint interface of the controller; and presenting, at the second endpoint interface, the second subset of the plurality of virtual functions, using the second set of address translation entries and a second translation unit associated with the second endpoint interface.

13. The method of claim 12, further comprising:

receiving, by virtual map logic of the controller, a transaction from a virtual function of the plurality of virtual functions, the transaction including a request identification and a memory address of a first host associated with the first endpoint interface;

converting, by the virtual map logic, the request identification to a virtual identification uniquely associated with the virtual function;

translating, by a virtualization unit of the controller, the memory address to an internal address for the first endpoint interface; and translating, by an outbound translation unit coupled to the first endpoint interface, the internal address for use by the first host.

14. The method of claim 12, further comprising:

transferring operations, through the controller, from a first host associated with the first endpoint interface to each virtual function of the first subset of the plurality of virtual functions; and transferring operations, through the controller, from a second host associated with the second endpoint interface to each virtual function of the second subset of the plurality of virtual functions.

15. The method of claim 12, further comprising:

presenting another virtual function of the peripheral device to a virtual function of the first endpoint interface.

* * * * *